(12) United States Patent
Schwede et al.

(10) Patent No.: US 8,648,158 B2
(45) Date of Patent: Feb. 11, 2014

(54) CONTINUOUSLY OPERATED METHOD FOR PRODUCING COPOLYMERS

(75) Inventors: Christian Schwede, Weinheim (DE); Mario Vierle, Wasserburg (DE); Timo Mangel, Ötigheim (DE); Gerhard Albrecht, Prien a. Chiemsee (DE); Volker Herzog, Darmstadt (DE); Klaus Arlt, Hamminkeln (DE)

(73) Assignee: Construction Research & Technology GmbH, Trostberg (DE)

( * ) Notice: Subject to any disclaimer, the term of this patent is extended or adjusted under 35 U.S.C. 154(b) by 643 days.

(21) Appl. No.: 12/866,973

(22) PCT Filed: Jan. 12, 2009

(86) PCT No.: PCT/EP2009/050260
§ 371 (c)(1),
(2), (4) Date: Oct. 15, 2010

(87) PCT Pub. No.: WO2009/100956
PCT Pub. Date: Aug. 20, 2009

(65) Prior Publication Data
US 2011/0190422 A1 Aug. 4, 2011
US 2012/0059091 A9 Mar. 8, 2012

(30) Foreign Application Priority Data

Feb. 13, 2008 (EP) .................... 08101598

(51) Int. Cl.
*C04B 24/26* (2006.01)
*C08F 16/26* (2006.01)
*C08F 4/46* (2006.01)

(52) U.S. Cl.
USPC ............... 526/258; 524/5; 526/181; 526/273

(58) Field of Classification Search
USPC ............... 526/258, 181, 273; 524/5
See application file for complete search history.

(56) References Cited

U.S. PATENT DOCUMENTS

| | | | |
|---|---|---|---|
| 3,560,454 A * | 2/1971 | Büning et al. | 526/64 |
| 6,214,958 B1 * | 4/2001 | Le-Khac et al. | 526/318.3 |
| 6,815,513 B2 | 11/2004 | Le-Khac et al. | |
| 6,869,988 B2 | 3/2005 | Schwartz et al. | |
| 7,482,405 B2 | 1/2009 | Matsumoto et al. | |
| 7,691,921 B2 | 4/2010 | Asano et al. | |
| 2001/0001797 A1 | 5/2001 | Le-Khac et al. | |
| 2004/0209979 A1 | 10/2004 | Schwartz et al. | |
| 2005/0113541 A1 | 5/2005 | Tsumori et al. | |
| 2006/0183820 A1 * | 8/2006 | Asano et al. | 524/5 |
| 2006/0247402 A1 | 11/2006 | Matsumoto et al. | |
| 2007/0043190 A1 | 2/2007 | Kraus et al. | |

FOREIGN PATENT DOCUMENTS

| | | |
|---|---|---|
| EP | 1528071 A1 | 5/2005 |
| EP | 1218427 B1 | 10/2005 |
| EP | 1690877 A1 | 8/2006 |
| WO | WO 01/07494 A1 | 2/2001 |
| WO | WO 2004/087602 A1 | 10/2004 |
| WO | WO 2004/094336 A2 | 11/2004 |
| WO | WO 2005/019288 A1 | 3/2005 |

OTHER PUBLICATIONS

PCT/EP2009/050260—Written Opinion of the International Searching Authority, Apr. 20, 2009.
PCT/ EP2009/050260—International Search Report, Apr. 20, 2009.

* cited by examiner

*Primary Examiner* — Ling Choi
*Assistant Examiner* — Chun-Cheng Wang
(74) *Attorney, Agent, or Firm* — Curatolo Sidoti Co., LPA; Joseph G. Curatolo; Salvatore A. Sidoti

(57) ABSTRACT

The invention relates to a process for the preparation of copolymer in a continuous mode of operation in a polymerization apparatus, comprising a polymerization reactor having feed lines and an outflow, free radical polymerization initiator, an acid monomer and polyether macromonomer being passed as monomeric starting materials into the polymerization reactor through the feed lines, initiator, monomeric starting materials and copolymer-containing reaction composition thermostated at −20 to +120° C. being present in the polymerization reactor, copolymer-containing reaction composition being discharged from the polymerization reactor through the outflow, the introduction of the polyether macromonomer into the polymerization reactor being effected separately from the acid monomer in a manner such that the polyether macromonomer is mixed with the initiator, monomeric starting materials and copolymer-containing reaction composition in the polymerization reactor and comes into contact with the acid monomer for the first time thereby.

15 Claims, 2 Drawing Sheets

CONTINUOUSLY OPERATED METHOD FOR PRODUCING COPOLYMERS

CROSS REFERENCE TO RELATED APPLICATIONS

Figure 1:
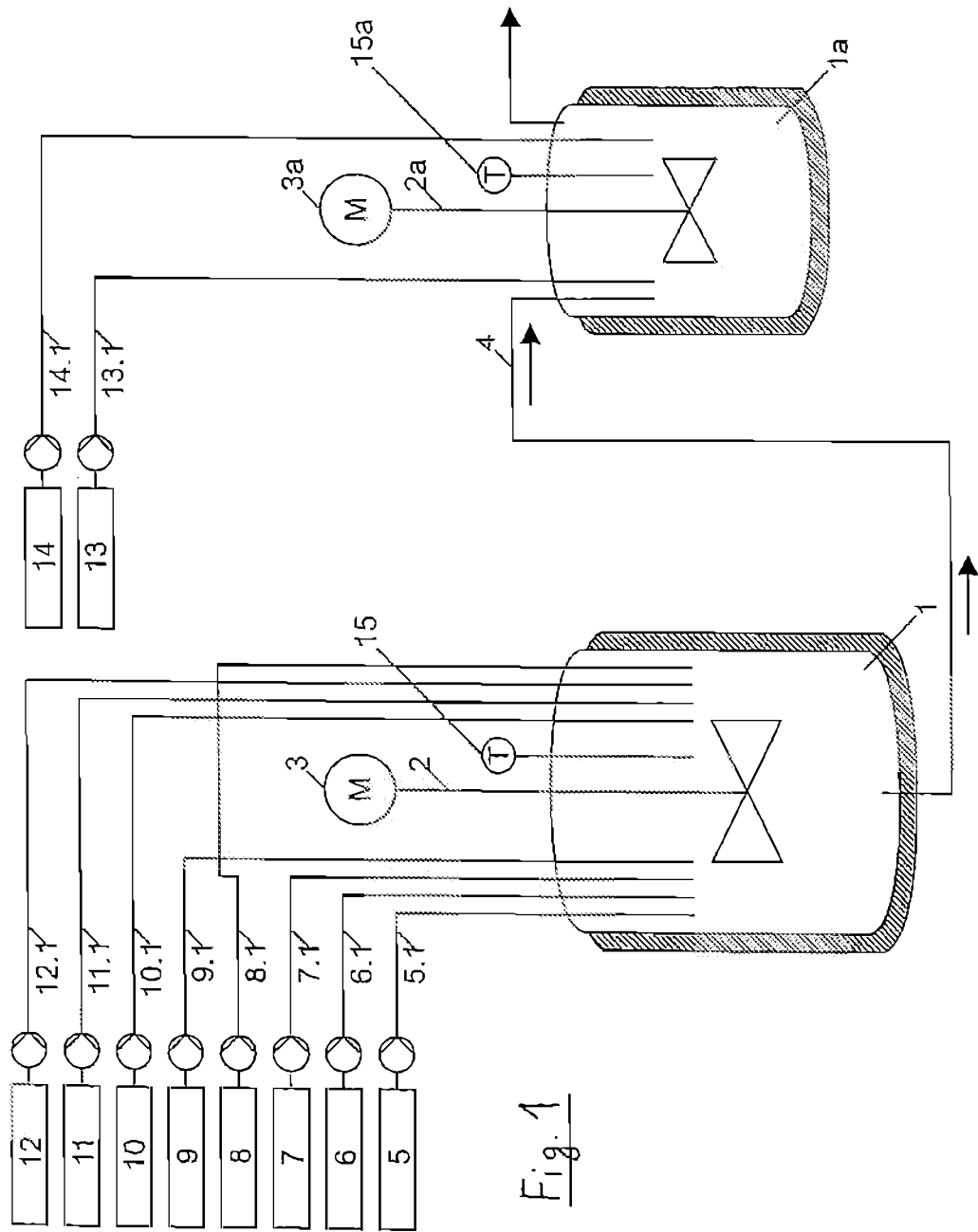

This application is a national stage application of International Application No. PCT/EP2009/050260, filed 12 Jan. 2009, which claims priority from European Patent Application Serial No. 08 101 598.4, filed 13 Feb. 2008, from which applications priority is claimed, and which are incorporated herein by reference.

The present invention relates to a process for the preparation of a copolymer, the copolymer and the use of the copolymer.

It is known that admixtures in the form of dispersants are often added to aqueous slurries of pulverulent inorganic or organic substances, such as clays, silicate powder, chalk, carbon black, crushed rock and hydraulic binders, in order to improve their processability, i.e. kneadability, spreadability, sprayability, pumpability or flowability. Such admixtures are capable of breaking up solid agglomerates, dispersing the particles formed and in this way improving the processability. This effect is also utilized in particular in a targeted manner in the preparation of building material mixtures which contain hydraulic binders, such as cement, lime, gypsum or anhydrite.

In order to convert these building material mixtures based on said binders into ready-to-use, processable form, as a rule substantially more mixing water is required than would be necessary for the subsequent hydration or hardening process. The proportion of cavities formed by excess, subsequently evaporating water in the concrete body leads to significantly poorer mechanical strengths and stabilities.

In order to reduce this excess proportion of water at a specified processing consistency and/or to improve the processability at a specified water/binder ratio, admixtures which are generally referred to as water reduction agents or superplasticizers are used. In particular, copolymers which are prepared by free radical copolymerization of acid monomers with polyether macromonomers are used in practice as such agents. The copolymerization is usually effected either by the batch or by the semibatch procedure.

EP-B-1 218 427 describes a continuous preparation process for said copolymers which are said to have better performance as superplasticizers/water reduction agents than corresponding polymers which have been prepared by the batch or semibatch mode of operation. According to the continuous preparation process described in EP-B-1 218 427, a monomer stream which contains firstly an acid monomer and secondly a polyether macromonomer is initially prepared. This monomer stream produced beforehand and containing acid monomer and polyether macromonomer is polymerized with an initiator stream in a reaction zone, a polymer stream finally being withdrawn from the reaction zone.

It was found that the premixing of the acid monomer and of the polyether macromonomer which was effected for the preparation of the monomer stream has disadvantages. This is because, inter alfa, acid monomer and polyether macromonomer undergo undesired secondary reactions with one another in the monomer stream. For example, the polyether macromonomer "ethoxylated hydroxyvinyl butyl ether" together with the acid monomer "acrylic acid" exhibits considerable secondary hydrolysis reactions below a pH of about 7 (relates to the underlying polymerization conditions). It has been found that the secondary reactions in the end have a considerable adverse effect on the quality of the copolymer dispersant obtained. Furthermore, the production of the monomer stream on an industrial scale requires the provision of an effective premixing apparatus which mixes acid monomer and polyether macromonomer thoroughly with one another even before the addition of the initiator.

The object of the present invention is therefore to provide an economical process for the preparation of copolymers which have good performance as dispersants for hydraulic binders, especially as superplasticizers/water reduction agents.

This object is achieved by a process for the preparation of copolymer in a continuous mode of operation in a polymerization apparatus, comprising a polymerization reactor having feed lines and an outflow, free radical polymerization initiator, an acid monomer and polyether macromonomer being passed as monomeric starting materials into the polymerization reactor through the feed lines, initiator, monomeric starting materials and copolymer-containing reaction composition thermostated at −20 to +120° C. being present in the polymerization reactor, copolymer-containing reaction composition being discharged from the polymerization reactor through the outflow, the introduction of the polyether macromonomer into the polymerization reactor being effected separately from the acid monomer in a manner such that the polyether macromonomer is mixed with the initiator, monomeric starting materials and copolymer-containing reaction composition in the polymerization reactor and comes into contact with the acid monomer for the first time thereby.

Acid monomer is to be understood as meaning monomers which are capable of free radical copolymerization, have at least one carbon double bond, contain at least one acid function and react as acid in an aqueous medium. Furthermore, acid monomer is also to be understood as meaning monomers which are capable of free radical copolymerization, have at least one carbon double bond, form at least one acid function as a result of hydrolysis reaction in an aqueous medium and react as acid in an aqueous medium (example: maleic anhydride). In the context of the present invention, polyether macromonomers are compounds which are capable of free radical copolymerization and have at least one carbon double bond and at least two ether oxygen atoms, with the proviso that the polyether macromonomer structural units present in the copolymer have side chains which contain at least two ether oxygen atoms.

What is important in the case of the process described above is that the acid monomer comes into contact with the polyether macromonomer only in the polymerization reactor and in particular in the presence of the polymerization initiator. This means that secondary reactions between acid monomer and polyether macromonomer in the time prior to the copolymerization are avoided since acid monomer and polyether macromonomer are brought into contact for the first time in the presence of the polymerization initiator under polymerization conditions. In this way, secondary reactions (e.g. hydrolysis reactions) between acid monomer and polyether macromonomer, which are often undesired to a considerable extent, can be suppressed. The copolymer superplasticizers obtained, which are prepared by the process according to the invention, show good performance as superplasticizer/water reduction agent or as dispersant for hydraulic binders.

A further substantial advantage of the process according to the invention is that no apparatus is required for premixing the acid monomer with the polyether macromonomer, the provision of which would mean a not inconsiderable economic cost in particular for the industrial scale. In the process according to the invention, the thorough mixing of the two monomers is effected in contrast in the reaction composition, e.g. with the aid of a stirring apparatus with which the polymerization reactor is frequently equipped.

In a preferred embodiment of the invention, the acid monomer is reacted by polymerization and a structural unit is produced thereby in the copolymer, which structural unit is according to one of the general formulae (Ia), (Ib), (Ic) and/or (Id)

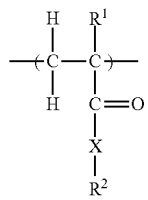
(Ia)

where
R$^1$ is identical or different (i.e. either identically or differently substituted within the copolymer) and is represented by H and/or a straight-chain or branched C$_1$-C$_4$ alkyl group (preferably H or CH$_3$);
X is identical or different and is represented by NH—(C$_n$H$_{2n}$) where n=1, 2, 3 or 4 and/or O—(C$_n$H$_{2n}$) where n=1, 2, 3 or 4 (preferably NH—C$_4$H$_8$) and/or by a unit not not present (i.e., —X is not present);
R$^2$ is identical or different and is represented by OH, SO$_3$H, PO$_3$H$_2$, O—PO$_3$H$_2$ and/or para-substituted C$_6$H$_4$—SO$_3$H, with the proviso that, if X is a unit not present, R$^2$ is represented by OH:

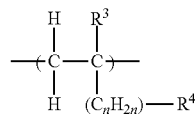
(Ib)

where
R$^3$ is identical or different and is represented by H and/or a straight-chain or branched C$_1$-C$_4$ alkyl group (preferably CH$_3$);
n=0, 1, 2, 3 or 4
R$^4$ is identical or different and is represented by SO$_3$H, PO$_3$H$_2$, O—PO$_3$H$_2$ and/or C$_6$H$_4$—SO$_3$H present in the para-substituted form;

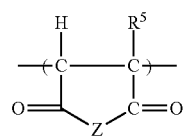
(Ic)

where
R$^5$ is identical or different and is represented by H and/or a straight-chain or branched C$_1$-C$_4$ alkyl group (preferably H);
Z is identical or different and is represented by O and/or NH;

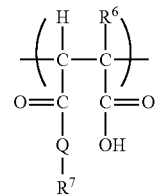
(Id)

where
R$^6$ is identical or different and is represented by H and/or a straight-chain or branched C$_1$-C$_4$ alkyl group (preferably H);
Q is identical or different and is represented by NH and/or O;
R$^7$ is identical or different and is represented by H, (C$_n$H$_{2n}$)—SO$_3$H where n=0, 1, 2, 3 or 4, (C$_n$H$_{2n}$)—OH where n=0, 1, 2, 3 or 4; (C$_n$H$_{2n}$)—PO$_3$H$_2$ where n=0, 1, 2, 3 or 4, (C$_n$H$_{2n}$)—OPO$_3$H$_2$ where n=0, 1, 2, 3 or 4, (C$_6$H$_4$)—SO$_3$H, (C$_6$H$_4$)—PO$_3$H$_2$, (C$_6$H$_4$)—OPO$_3$H$_2$ and/or (C$_m$H$_{2m}$)$_a$—O-(A'O)$_\alpha$—R$^9$ where m=0, 1, 2, 3 or 4, e=0, 1, 2, 3 or 4, A'=C$_{x'}$H$_{2x'}$ where x'=2, 3, 4 or 5 (preferably x'=2) and/or CH$_2$C(C$_6$H$_5$)H—, α=an integer from 1 to 350 (preferably α=15-200) where R$^9$ is identical or different and represented by a straight-chain or branched C$_1$-C$_4$ alkyl group (preferably CH$_3$).

Regarding R$^2$, R$^4$ and R$^7$ in the structural formulae Ia, Ib and Id, it should be noted that the corresponding acid functions may be present in deprotonated form (in the polymer), in particular on addition of bases (salt formation).

The expression "identical or different" used above and below is intended in each case to mean constancy or variability within the copolymer produced by the process according to the invention.

In practice, methacrylic acid, acrylic acid, maleic acid, maleic anhydride, a monoester of maleic acid or a mixture of a plurality of these components is frequently used as the acid monomer.

In a preferred embodiment of the invention, the polyether macromonomer is reacted by polymerization and a structural unit is produced thereby in the copolymer, which structural unit is according to the general formulae (IIa), (IIb) and/or (IIc)

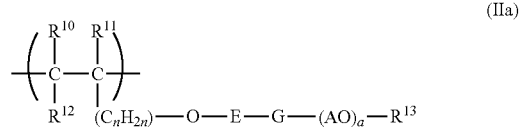
(IIa)

where
R$^{10}$, R$^{11}$ and R$^{12}$ in each case are identical or different and, independently of one another, are represented by H and/or a straight-chain or branched C$_1$-C$_4$ alkyl group (preferably H and/or CH$_3$);
E is identical or different and is represented by a straight-chain or branched C$_1$-C$_6$ alkylene group (typically C$_1$, C$_2$, C$_3$, C$_4$, C$_5$ or C$_6$ but preferably C$_2$ and C$_4$), a cyclohexyl group, CH$_2$—C$_6$H$_{10}$, C$_6$H$_4$ present in ortho-, meta- or para-substituted form and/or a unit not present (i.e., -E is not present);

G is identical or different and is represented by O, NH and/or CO—NH, with the proviso that, if E is a unit not present, G is also a unit not present (i.e. -G is not present);

A is identical or different and is represented by $C_xH_{2x}$, where x=2, 3, 4 and/or 5 (preferably x=2) and/or $CH_2CH(C_6H_5)$;

n is identical or different and is represented by 0, 1, 2, 3, 4 and/or 5;

a is identical or different and is represented by an integer from 2 to 350 (preferably 10-200);

$R^{13}$ is identical or different and is represented by H, a straight-chain or branched $C_1$-$C_4$ alkyl group, CO—$NH_2$, and/or $COCH_3$ (preferably H, $CH_3$);

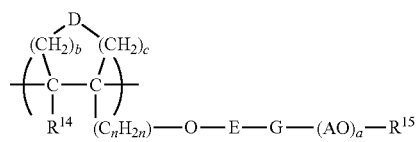

(IIb)

where $R^{14}$ is identical or different and is represented by H and/or a straight-chain or branched $C_1$-$C_4$ alkyl group (preferably H);

E is identical or different and is represented by a straight-chain or branched $C_1$-$C_6$ alkylene group (preferably $C_2H_4$), a cyclohexyl group, $CH_2$—$C_6H_{10}$, $C_6H_4$ present in ortho-, meta- or para-substituted form and/or by a unit not present (i.e. -E is not present);

G is identical or different and is represented by a unit not present, O, NH and/or CO—NH, with the proviso that, if E is a unit not present, G is also a unit not present (i.e. -G is not present);

A is identical or different and is represented by $C_xH_{2x}$ where x=2, 3, 4 and/or 5 (preferably x=2) and/or $CH_2CH(C_6H_5)$;

n is identical or different and is represented by 0, 1, 2, 3, 4 and/or 5;

a is identical or different and is represented by an integer from 2 to 350 (preferably 10-200);

D is identical or different and is represented by a unit not present (i.e. -D is not present), NH and/or O, with the proviso that, if D is a unit not present: b=0, 1, 2, 3 or 4 and c=0, 1, 2, 3 or 4, where b+c=3 or 4, and with the proviso that, if D is NH and/or O: b=0, 1, 2 or 3, c=0, 1, 2 or 3, where b+c=2 or 3;

$R^{15}$ is identical or different and is represented by H, a straight-chain or branched $C_1$-$C_4$ alkyl group, CO—$NH_2$, and/or $COCH_3$ (preferably H);

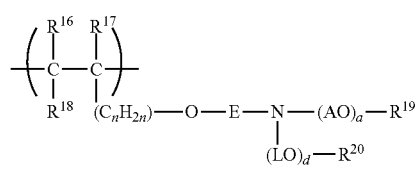

(IIc)

where $R^{16}$, $R^{17}$ and $R^{18}$ in each case are identical or different and, independently of one another, are represented by H and/or a straight-chain or branched $C_1$-$C_4$ alkyl group (preferably H and/or $CH_3$);

E is identical or different and is represented by a straight-chain or branched $C_1$-$C_6$ alkylene group (preferably $C_2H_4$ or $C_4H_8$), a cyclohexyl group, $CH_2$—$C_6H_{10}$, $C_6H_4$ present in ortho-, meta- or para-substituted form and/or by a unit not present (i.e. -E is not present);

A is identical or different and is represented by $C_xH_{2x}$ where x=2, 3, 4 and/or 5 (preferably x=2) and/or $CH_2CH(C_6H_5)$;

n is identical or different and is represented by 0, 1, 2, 3, 4 and/or 5;

L is identical or different and is represented by $C_xH_{2x}$ where x=2, 3, 4 and/or 5 (preferably x=2) and/or $CH_2$—$CH(C_6$—$H_5)$;

a is identical or different and is represented by an integer from 2 to 350 (preferably 10-200);

d is identical or different and is represented by an integer from 1 to 350 (preferably 10-200);

$R^{19}$ is identical or different and is represented by H and/or a straight-chain or branched $C_1$-$C_4$ alkyl group (preferably H), $R^{20}$ is identical or different and is represented by H and/or a straight-chain $C_1$-$C_4$ alkyl group (preferably H).

In general, it may be said that the polyalkoxy side chains $(AO)_a$ of the polyether macromonomers are generally pure polyethoxy side chains, but not seldom mixed polyalkoxy side chains, in particular those which contain both propoxy and ethoxy groups, are also present.

In practice, alkoxylated isoprenol (alkoxylated 3-methyl-3-buten-1-ol) and/or alkoxylated hydroxybutyl vinyl ether and/or alkoxylated (meth)allyl alcohol (allyl alcohol is preferred to methallyl alcohol) usually having in each case an arithmetic mean number of 4 to 350 oxyalkylene groups is frequently used as the polyether macromonomer. Alkoxylated hydroxybutyl vinyl ether is particularly preferred.

In addition to the acid monomer and the polyether macromonomer, further monomer types may also be used. This is then as a rule implemented in practice in that a vinylically unsaturated compound is introduced as monomeric starting material into the polymerization reactor and is reacted by polymerization and a structural unit is produced thereby in the copolymer, which structural unit is present according to the general formulae (IIIa) and/or (IIIb)

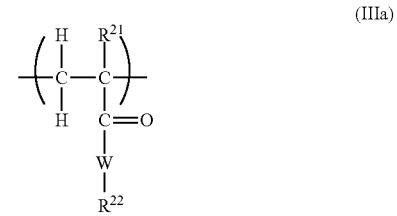

(IIIa)

where $R^{21}$ is identical or different and is represented by H and/or a straight-chain or branched $C_1$-$C_4$ group (preferably H or $CH_3$);

W is identical or different and is represented by O and/or NH;

$R^{22}$ is identical or different and is represented by a branched or straight-chain $C_1$-$C_5$-monohydroxyalkyl group ($C_1$, $C_2$, $C_3$, $C_4$ or $C_5$ is each typical but $C_2$ and/or $C_3$ is preferred);

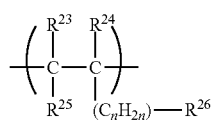

(IIIb)

where
R²³, R²⁴ and R²⁵ in each case are identical or different and in each case, independently of one another, are represented by H and/or a straight-chain or branched $C_1$-$C_4$ alkyl group (preferably H and/or $CH_3$);

n is identical or different and is represented by 0, 1, 2, 3 and/or 4;

$R^{26}$ is identical or different and is represented by $(C_6H_5)$, OH and/or $OCOCH_3$.

Typical monomers which produce the structural units (IIIa) or (IIIb) by polymerization are, for example 2-hydroxypropyl acrylate, isoprenol or allyl alcohol. It would also be possible to mention hydroxybutyl vinyl ether as a further typical monomer in this context.

Usually, altogether at least 45 mol %, but preferably at least 80 mol %, of all structural units of the copolymer produced by the process are produced by polymerization of acid monomer and polyether macromonomer.

In a preferred embodiment, polyether macromonomer is passed into the polymerization reactor in an amount per mole of acid monomer such that an arithmetic mean molar ratio of acid monomer structural units to polyether macromonomer structural units of 20:1 to 1:1, preferably of 12:1 to 1:1, is established in the copolymer formed.

As a rule, a redox initiator is used as the free radical polymerization initiator. In general, the system $H_2O_2$/$FeSO_4$ is then chosen as the redox initiator, preferably together with a reducing agent. Suitable reducing agents are sodium sulphite, the disodium salt of 2-hydroxy-2-sulphinatoacetic acid, the disodium salt of 2-hydroxy-2-sulphonatoacetic acid, sodium hydroxymethanesulphinate, ascorbic acid, isoascorbic acid or mixtures thereof. Other systems, e.g. those based on tert-butyl hydroperoxide, ammonium peroxodisulphate or potassium peroxodisulphate, are also suitable as the redox initiator system.

In a less preferred embodiment, initiator components, e.g. $H_2O_2$, and the polyether macromonomer in premixed form are passed in one stream into the polymerization reactor.

In principle, however, all compounds decomposing into free radicals under polymerization conditions, such as, for example, peroxides, hydroperoxides, persulphates azo compounds and perphosphates, can be used as initiators. The combination of the free radical formers with suitable reducing agents gives known redox systems or redox catalysts. Suitable reducing agents are, for example, sodium sulphite, the disodium salt of 2-hydroxy-2-sulphonatoacetic acid, the disodium salt of 2-hydroxy-2-sulphinatoacetic acid, sodium hydroxymethanesulphinate, ascorbic acid, isoascorbic acid, amines, such as diethanolamine or triethanolamine, hydroxylamine or mixtures thereof. Expediently, with the use of redox systems or catalysts, water-soluble salts of transition metals, such as iron, cobalt, nickel or silver, are additionally used; iron salts are preferably used here.

In general, a chain regulator which is preferably present in dissolved form is passed into the polymerization reactor.

The monomeric starting materials and/or the initiator can be passed into the polymerization reactor in the form of their aqueous solutions.

The polymerization reactor is preferably present as a continuously operated stirred tank.

Frequently, the polymerization apparatus also has at least one continuously operated reactor which is downstream of the polymerization reactor and into which the copolymer-containing reaction composition is passed via the outflow of the polymerization reactor. Monomeric starting materials and/or initiator components can then be passed into the downstream reactor.

The invention also relates to a copolymer which can be prepared by the process described above. The copolymer according to the invention is usually present as a comb polymer.

The invention furthermore relates to the use of the copolymer according to the invention as a dispersant for hydraulic binders.

Below, the invention is to be described in more detail with reference to working examples.

Figure 2:
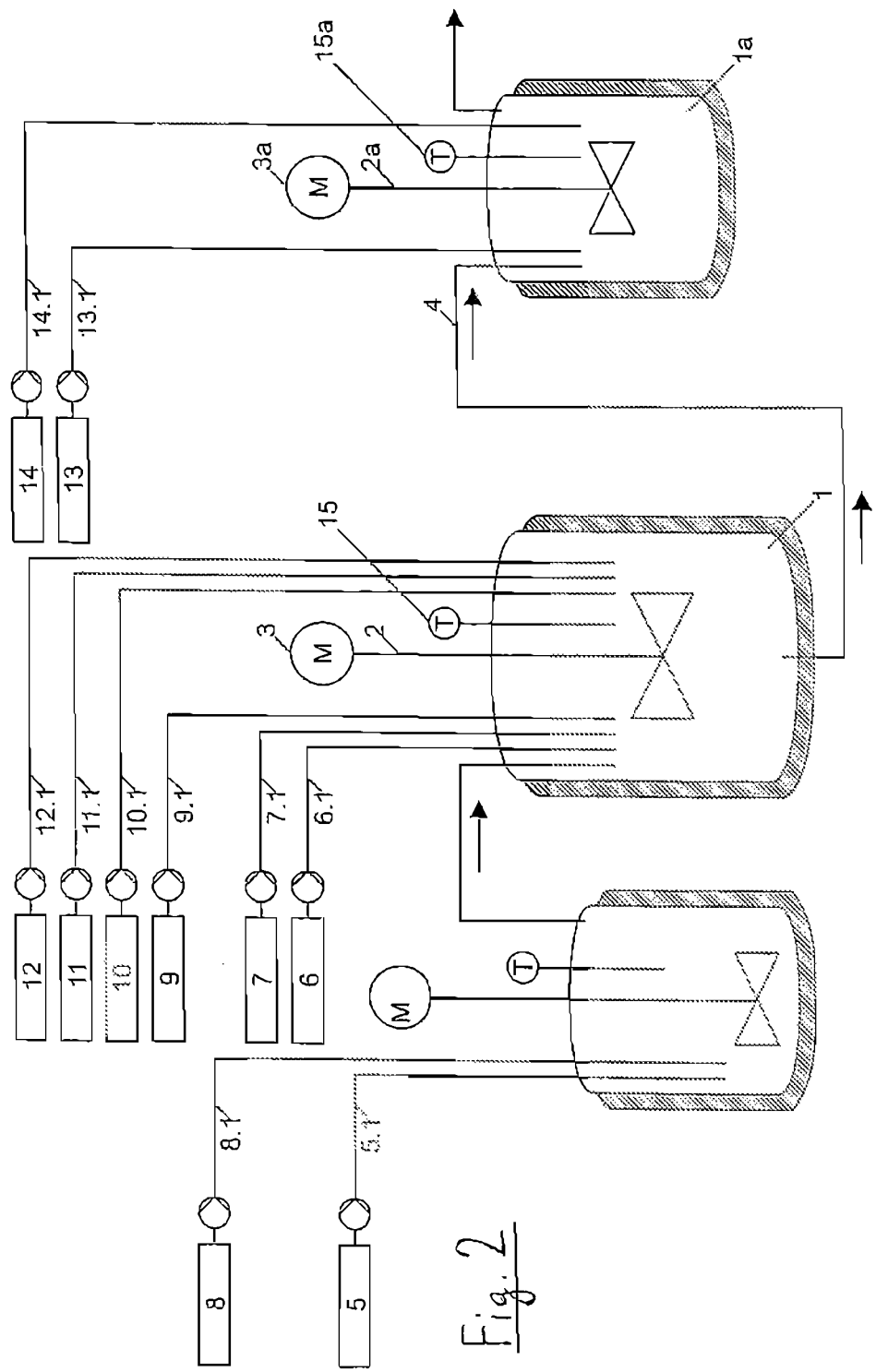

For illustrating the working examples, the drawing shows, in FIG. 1, a schematic plant setup for carrying out the process according to the invention and, in FIG. 2, a corresponding comparative schematic diagram for carrying out a process which is not according to the invention.

DESCRIPTION OF THE POLYMERIZATION APPARATUS USED

An example of a typical production plant designed on the laboratory scale for the continuous production of the copolymers described is shown schematically in FIG. 1.

The reaction unit consists of two double-walled reactors (1 and 1a), both equipped with stirring apparatuses (2 and 2a) and motors (3 and 3a). The total volume of the reactors is 0.657 dm³ (reactor 1) and 0.311 dm³ (reactor 1a). The reactors are connected by a pipe line (4).

Reactor (1) is connected to the storage vessels of the reactants by feed lines. By means of intermediate pumps, a defined material flow can be established. The plant setup contains the following storage vessels (closable glass containers with magnetic stirring apparatus): (5) for the vinyl ether component (the polyether macromonomer); (6) for an aqueous base solution for establishing the pH required in the reaction; (7) for $H_2O$; (8) for the acid monomer 2-propenoic acid (acrylic acid), (9) for the chain-transfer components, (10) for the first initiator component, (11) for the second initiator component and (12) for the third initiator component. The feed pipes of the storage vessels (5.1, 6.1, 7.1, 8.1, 9.1, 10.1, 11.1 and 12.1) lead through the reactor cover into the reactor and the reaction medium, the depth of penetration into the reaction medium being chosen so that the metering takes place in a zone with high mixing efficiency. For ensuring the prevention of premixing of acid monomer and polyether macromonomer, a maximum spacing of the feed lines 5.1 and 8.1 at the reactor is chosen. The reactor (1a) is likewise connected to the storage vessels (13) and (14) (the volume in each case 5.00 dm³) for reactants by feed lines (13.1 and 14.1). By means of pumps which are likewise intermediate, a defined material stream can be established. Furthermore, the plant setup contains the following components: (13) for $H_2O$ or an aqueous base solution and (14) for the second initiator component.

Reactors 1 and 1a each also contain a temperature probe (15 and 15a).

PREPARATION EXAMPLES

Example 1

According to the Invention: Preparation of a Polymer without Premixing of the Monomer Components The apparatus is flushed with water at the beginning and reactors 1 and 1a are flooded with water. 4.478 kg of $H_2O$ are initially introduced into storage vessel 5 and 0.022 kg of an aqueous KOH solution (20% by weight) and, as polyether macromonomer, 4.500 kg of vinyloxybutylpoly(ethylene oxide) having a number average molar mass of 6000 g·mol$^{-1}$ are added with stirring. The solution is stirred until complete dissolution of the vinyloxybutylpoly(ethylene oxide). Storage vessel 6 is filled with 0.100 kg of an aqueous KOH solution (20% by weight), and storage vessel 7 with 0.100 kg of demineralized water, 0.420 kg of $H_2O$ are initially introduced into storage vessel 8 and 0.280 kg of the acid monomer 2-propenoic acid (acrylic acid) is introduced with stirring. Storage vessel 9 is filled with 0.500 kg of an 8% strength solution of 3-MPS (3-mercaptopropanoic acid), and storage vessel 10 with a 5% strength $H_2O_2$ solution. 0.235 kg of water are initially introduced into storage vessel 11, 0.015 kg of Brüggolit® FF6 M (Brüggolit® FF6 M is a mixture of sodium sulphite, disodium salt of 2-hydroxy-2-sulphinatoacetic acid and disodium salt of 2-hydroxy-2-sulphinatoacetic acid, obtainable from BrüggemannChemical L. Brüggemann KG) is added with stirring and stirring is effected until dissolution is complete. Storage vessel 12 is filled with 0.150 kg of an aqueous solution of $FeSO_4.7H_2O$ (1.4% by weight). Storage vessel 13 is filled with 0.100 kg of demineralized water, and storage vessel 14 is filled with 0.150 kg of a Brüggolit® FF6 M solution which was prepared in a manner analogous to that introduced into storage vessel 11.

At the beginning of the reaction, the two stirrers and all pumps are started and the cooling water jacket temperature is adjusted to that the temperature of the reaction medium is constant at 15° C. The material flows of the reactants from storage vessels 5, 8 and 9 are accordingly adjusted so that the sum of the average residence times is 20 minutes in reactor 1 and 10 minutes in reactor 1a. The further material streams are adjusted as follows: KOH solution (storage vessel 6): 0.008 kg·h$^{-1}$; $H_2O$ (storage vessel 7): 0.006 kg·h$^{-1}$; initiator components 10, 11 and 12: 0.030 kg·h$^{-1}$; 0.036 kg·h$^{-1}$ and 0.020 kg·h$^{-1}$. The following are established as material streams of the reactants in reactor 1a: $H_2O$ (storage vessel 13): 0.006 kg·h$^{-1}$ and initiator component 2 (storage vessel 14): 0.006 kg·h$^{-1}$. It is ensured that the introduction of the polyether macromonomer in the polymerization reactor takes place separately from that of the acid monomer in a manner such that the polyether macromohomer is mixed with the initiator, monomeric starting materials and copolymer-containing reaction composition in the polymerization reactor and comes into contact with the acid monomer for the first time thereby. After adjustment of the material streams, in each case a sample is taken at time intervals which correspond to the sum of the average residence times of the reactors and is analyzed by size exclusion chromatography. The steady state of the experiment is reached when the shape of the gel chromatography elution diagram (GPC diagrams) and the average molar mass value determined no longer change as a function of time. After reaching the steady state, a sample representative for the experimental conditions is taken (polymer 1) and is analyzed by size exclusion chromatography, and the molar mass distribution and the mean values thereof and the conversion are determined therefrom. At the end of the reaction, all material streams are set to zero and the apparatus is flushed with water.

Comparative Example 1

Preparation of a Polymer with Premixing of the Monomer Components in a Storage Vessel and Metering from this Storage Vessel First, the vinyloxybutylene poly(ethylene glycol) solution (vinyloxybutylpoly(ethylene oxide) solution) described in Example 1 is prepared and then, with further stirring, the amount of water and 2-propenoic acid, described in Example 1, is mixed into storage vessel 5. The material streams are adjusted analogously to those described in Example 1. The experimental procedure is analogous to Example 1. After reaching the steady state of the experiment by a procedure described in Example 1, a sample is taken (polymer 2) and the molar mass distribution, the mean values thereof and the conversion are determined by means of size exclusion chromatography.

Comparative Example 2

Preparation of a Polymer with Premixing of the Monomer Components by Means of a Premixing Unit (Thermostated at 25° C.)

The polymerization plant on the laboratory scale is modified by installation of a premixing unit (FIG. 2). The premixing unit consists of a thermostatable container (having a volume of 0.55 dm$^3$) which is thoroughly mixed by means of a stirrer and is equipped with two feed lines for the aqueous solutions to be mixed and a discharge line for the mixed solution. For this purpose, the premixing unit is installed in feed line 5.1 and in addition the feed line 8.1 is connected to the premixing unit so that the monomer components are mixed with one another and are metered into the reactor together by means of a feed line.

The material streams are adjusted in a manner analogous to that described in Example 1. The experimental procedure is analogous to Example 1, a temperature of 25° C. being set in the premixer to simulate room temperature. After reaching the steady state of the experiment by a procedure described in Example 1, a sample is taken (polymer 3) and the molar mass distribution, the mean values thereof and the conversion are determined by means of size exclusion chromatography.

Comparative Example 3

Preparation of a Polymer with Premixing of the Monomer Components by Means of a Premixing Unit (Thermostated at 35° C.)

Plant setup and polymerization procedure are analogous to Comparative Example 2, the premixing unit being thermostated at 35° C. After reaching the steady state of the experiment by a procedure as described in Example 1, a sample is taken (polymer 4) and the molar mass distribution, the mean values thereof and the conversion are determined by means of size exclusion chromatography.

Analysis of the copolymers from Example 1 and Comparative Examples 1 to 3:

The polymers from Example 1 and Comparative Examples 1 to 3 are analyzed by means of size exclusion chromatography with regard to average molar mass and conversion (column combination: Suprema 1000 and Suprema 30 from PSS, Mainz; eluent: aqueous solution of $Na_2HPO_4$ (0.03 mol/l) and 0.5 g/l of sodium azide; injection volume 50 μl; flow rate 0.8 ml/min). The calibration for determining the average molar mass was effected using linear poly(ethylene oxide) standards. As a measure of conversion, the copolymer peak is standardized to relative height of 1 and the height of the peak of the unconverted macromonomer/PEG-containing oligomer is used as a measure of content of residual monomer.

The following values could be determined:

| Polymer name | Residual monomer/height relative to polymer peak | $\overline{M_w}/g \cdot mol^{-1}$ |
|---|---|---|
| Polymer 1 (from Example 1) | 0.40 | 41 800 |
| Polymer 2 (from Comparative Example 1) | 2.25 | 10 700 |
| Polymer 3 (from Comparative Example 2) | 0.82 | 34 000 |
| Polymer 4 (from Comparative Example 3) | 1.30 | 26 000 |

The polymers 2, 3 and 4 prepared with premixing of the monomers show substantially higher contents of macromonomer/polyethylene glycol (PEG)-containing oligomer not converted into polymer than polymer 1 which was prepared by means of metering, according to the invention, of the components into the reactor. Premixing of the components therefore clearly results in a higher degree of hydrolysis and hence in a reduction of conversion.

Use Tests

Polymers 1 to 4 are investigated with regard to their properties as concrete plasticizers in a suitable test system. For this purpose, all polymers were adjusted to a pH of 6.5±0.2 beforehand with a solution of NaOH in water (20% by weight) and small amounts of a conventional antifoam are added for controlling the air void content.

On carrying out the tests, first 6.00 kg of a cement CEM I 52.5 R; 9.41 kg of quartz sand and 19.17 kg of aggregates are dry-mixed for 30 seconds; 1.05 kg of water are added and mixing is effected for a further 90 seconds. Thereafter, a further 1.05 kg of water and in each case $8.40 \cdot 10^{-3}$ kg of polymer (based on the polymer solids content) are added and mixing is effected for a further 90 seconds (corresponding to a water/cement ratio of 0.35 and a polymer dose of 0.14% of solid, based on the weight of cement taken). Thereafter, the slump is determined according to DIN EN 12350-5 directly after the preparation and after 10 and 30 minutes. The following values were determined:

| | Slump/cm | | | |
|---|---|---|---|---|
| Polymer | after preparation | 10 minutes | 30 minutes | Remark |
| Polymer 1 | 48.5 | 39 | 33.5 | no longer |
| Polymer 2 | 37 | 34 | — | processable |
| Polymer 3 | 37.5 | 31 | — | at |
| Polymer 4 | 33.5 | 33 | — | 30 minutes |

Polymer 1 prepared according to the invention shows a substantially better plasticizing effect at the same dose directly after preparation of the concrete than the polymers 2, 3 and 4 prepared with premixing. Furthermore, it maintains consistency substantially better. Concrete which was prepared using polymers 2, 3 and 4 is no longer processable after 30 minutes. Thus, the preparation, according to the invention, of the polymers leads to polymers having substantially better performance characteristics.

The invention claimed is:
1. Process for the preparation of a copolymer in a continuous mode of operation in a polymerization apparatus, comprising a polymerization reactor having feed lines and an outflow, free radical polymerization initiator, an acid monomer and polyether macromonomer being passed as monomeric starting materials into the polymerization reactor through the feed lines, initiator, monomeric starting materials and copolymer-containing reaction composition thermostated at −20 to +120° C. being present in the polymerization reactor, copolymer-containing reaction composition being discharged from the polymerization reactor through the outflow, the introduction of the polyether macromonomer into the polymerization reactor being effected separately from the acid monomer in a manner such that the polyether macromonomer is mixed with the initiator, monomeric starting materials and copolymer-containing reaction composition in the polymerization reactor and comes into contact with the acid monomer for the first time thereby, and wherein the polymerization apparatus also comprises at least one continuously operated reactor which is downstream of the polymerization reactor and into which the copolymer-containing reaction composition is passed via the outflow of the polymerization reactor.

2. The Process according to claim 1, wherein the acid monomer is reacted by polymerization and a structural unit is produced thereby in the copolymer, which structural unit is according to one of the general formulae (Ia), (Ib), (Ic) and/or (Id)

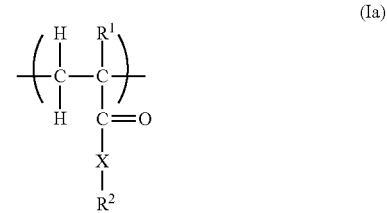

(Ia)

where
$R^1$ is identical or different and is represented by H and/or a straight-chain or branched $C_1$-$C_4$ alkyl group;
X is identical or different and is represented by NH—$(C_nH_{2n})$ where n=1, 2, 3 or 4 and/or O—$(C_2H_{2n})$ where n=1, 2, 3 or 4 and/or by a unit not present;
$R^2$ is identical or different and is represented by $SO_3H$, $PO_3H_2$, O—$PO_3H_2$ and/or para-substituted $C_6H_4$—$SO_3H$, with the proviso that, if X is a unit not present, $R^2$ is represented by OH;

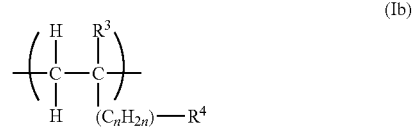

(Ib)

where
$R^3$ is identical or different and is represented by H and/or a straight-chain or branched $C_1$-$C_4$ alkyl group;
n=0,1,2,3 or 4;

$R^4$ is identical or different and is represented by $SO_3H$, $PO_3H_2$, O—$PO_3H_2$ and/or $C_6H_4$—$SO_3H$ present in the para-substituted form;

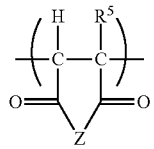
(Ic)

where
$R^5$ is identical or different and is represented by H and/or a straight-chain or branched $C_1$-$C_4$ alkyl group;
Z is identical or different and is represented by O and/or NH;

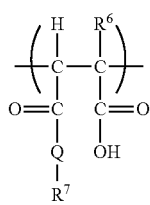
(Id)

where
$R^6$ is identical or different and is represented by H and/or a straight-chain or branched $C_1$-$C_4$ alkyl group;
Q is identical or different and is represented by NH and/or O;
$R^7$ is identical or different and is represented by H, $(C_nH_{2n})$—$SO_3H$ where n=0, 1, 2, 3 or 4,$(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-$(A'O)_\alpha$—$R^9$ where m=0, 1, 2, 3 or 4, e=0, 1, 2, 3 or 4, A'=$C_xH_{2x'}$ where x'=2, 3, 4 or 5and/or $CH_2C(C_6H_5)H$—, α= an integer from 1 to 350 with $R^9$ being identical or different and being represented by a straight-chain or branched $C_1$-$C_4$ alkyl group.

3. The Process according to claim 1, wherein the acid monomer used is methacrylic acid, acrylic acid, maleic acid, maleic anhydride, a monoester of maleic acid or a mixture of a plurality of these components.

4. The Process according to claim 1, wherein the polyether macromonomer is reacted by polymerization and a structural unit is produced thereby in the copolymer, which structural unit is according to the general formulae (IIa), (IIb) and/or (IIc)

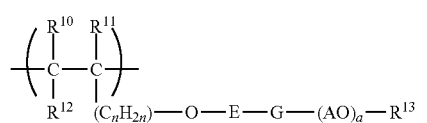
(IIa)

where
$R^{10}$, $R^{11}$ and $R^{12}$ in each case are identical or different and, independently of one another, are represented by H and/or a straight-chain or branched $C_1$-$C_4$ alkyl group;

E is identical or different and is represented by a straight-chain or branched $C_1$-$C_6$ alkylene group, a cyclohexyl group, $CH_2$-$C_6H_{10}$, $C_6H_4$ present in ortho-, meta- or para-substituted form and/or a unit not present;
G is identical or different and is represented by O, NH and/or CO—NH, with the proviso that, if E is a unit not present, G is also present as a unit not present;
A is identical or different and is represented by $C_xH_{2x}$ where x=2, 3, 4 and/or 5 and/or $CH_2CH(C_6H_5)$;
n is identical or different and is represented by 0, 1, 2, 3, 4 and/or 5;
a is identical or different and is represented by an integer from 2 to 350;
$R^{13}$ is identical or different and is represented by H, a straight-chain or branched $C_1$-$C_4$ alkyl group, CO—$NH_2$, and/or $COCH_3$;

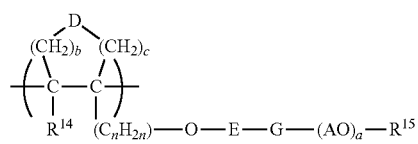
(IIb)

where
$R^{14}$ is identical or different and is represented by H and/or a straight-chain or branched $C_1$-$C_4$ alkyl group;
E is identical or different and is represented by a straight-chain or branched $C_1$-$C_6$ alkylene group, a cyclohexyl group, $CH_2$—$C_6H_{10}$, $C_6H_4$ present in ortho-, meta- or para-substituted form and/or by a unit not present;
G is identical or different and is represented by a unit not present, O, NH and/or CO—NH, with the proviso that, if E is a unit not present, G is also present as a unit not present;
A is identical or different and is represented by $C_xH_{2x}$ where x=2, 3, 4 and/or 5 and/or $CH_2CH(C_6H_5)$;
n is identical or different and is represented by 0, 1, 2, 3, 4 and/or 5;
a is identical or different and is represented by an integer from 2 to 350;
D is identical or different and is represented by a unit not present, NH and/or O, with the proviso that if D is a unit not present: b=0, 1, 2, 3 or 4 and c=0, 1, 2, 3 or 4, where b+c=3 or 4, and with the proviso that if D is NH and/or O: b=0, 1, 2 or 3, c=0, 1, 2 or 3, where b+c=2 or 3;
$R^{15}$ is identical or different and is represented by H, a straight-chain or branched $C_1$-$C_4$ alkyl group, CO—$NH_2$ and/or $COCH_3$;

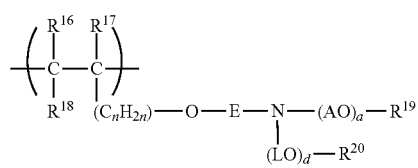
(IIc)

where
$R^{16}$, $R^{17}$ and $R^{18}$ in each case are identical or different and, independently of one another, are represented by H and/or a straight-chain or branched $C_1$-$C_4$ alkyl group;
E is identical or different and is represented by a straight-chain or branched $C_1$-$C_6$ alkylene group, a cyclohexyl group, $CH_2$—$C_6H_{10}$, $C_6H_4$ present in ortho-, meta- or para-substituted form and/or by a unit not present;

A is identical or different and is represented by $C_xH_{2x}$ where x=2, 3, 4 and/or 5 and/or $CH_2CH(C_6H_5)$;

n is identical or different and is represented by 0, 1, 2, 3, 4 and/or 5;

L is identical or different and is represented by $C_xH_{2x}$ where x=2, 3, 4 and/or 5 and/or $CH_2$—$CH(C_6H_5)$;

a is identical or different and is represented by an integer from 2 to 350;

d is identical or different and is represented by an integer from 1 to 350;

$R^{19}$ is identical or different and is represented by H and/or a straight-chain or branched $C_1$-$C_4$ alkyl group, $R^{20}$ is identical or different and is represented by H and/or a straight-chain $C_1$-$C_4$ alkyl group.

5. The Process according to claim 1, wherein the polyether macromonomer used is alkoxylated isoprenol and/or alkoxylated hydroxybutyl vinyl ether and/or alkoxylated (meth)allyl alcohol optionally having in each case an arithmetic mean number of 4 to 350 oxyalkylene groups.

6. The Process according to claim 1, wherein as monomeric starting material, further comprising a vinylically unsaturated compound which is passed into the polymerization reactor and is reacted by polymerization, a structural unit is produced thereby in the copolymer, which structural unit is present according to the general formulae (IIIa) and/or (IIIb)

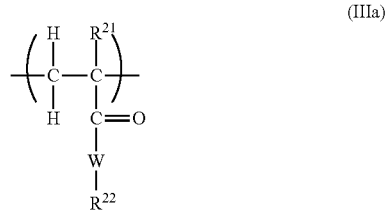
(IIIa)

where $R^{21}$ is identical or different and is represented by H and/or a straight-chain or branched $C_1$-$C_4$ group;

W is identical or different and is represented by O and/or NH;

$R^{22}$ is identical or different and is represented by a branched or straight-chain $C_1$-$C_5$-monohydroxyalkyl group;

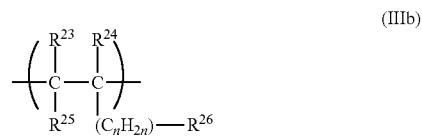
(IIIb)

where $R^{23}$, $R^{24}$ and $R^{25}$ in each case are identical or different and in each case, independently of one another, are represented by H and/or a straight-chain or branched $C_1$-$C_4$ alkyl group;

n is identical or different and is represented by 0, 1, 2, 3 and/or 4;

$R^{26}$ is identical or different and is represented by $(C_6H_5)$, OH and/or —$COCH_3$.

7. The Process according to claim 1, wherein the free radical polymerization initiator used is a redox initiator.

8. The Process according to claim 7 wherein the system $H_2O_2/FeSO_4$, which is used together with a reducing agent, is chosen as the redox initiator.

9. The Process according to claim 8, wherein the reducing agent used is sodium sulphite, the disodium salt of 2-hydroxy-2-sulphinatoacetic acid, the disodium salt of 2-hydroxy-2-sulphonatoacetic acid, sodium hydroxymethanesulphinate, ascorbic acid, isoascorbic acid or mixtures thereof.

10. The Process according to claim 1, wherein the polyether macromonomer is passed into the polymerization reactor in an amount per mole of the acid monomer such that an arithmetic mean molar ratio of the acid monomer structural units to the polyether macromonomer structural units of 20:1 to 1:1, optionally of 12:1 to 1:1, is established in the copolymer formed.

11. The Process according to claim 1, wherein altogether at least 45 mol %, but optionally at least 80 mol %, of all structural units of the copolymer are produced by polymerization of the acid monomer and the polyether macromonomer.

12. The Process according to claim 1, wherein a chain regulator, which is optionally present in dissolved form, is passed into the polymerization reactor.

13. The Process according to claim 1, wherein the monomeric starting materials and/or the initiator are passed into the polymerization reactor in the form of their aqueous solutions.

14. The Process according to claim 1, wherein the polymerization reactor is present as a continuously operated stirred tank.

15. The Process according to claim 1, wherein the monomeric starting materials and/or the initiator components are passed into the downstream reactor.

* * * * *